No. 812,412. PATENTED FEB. 13, 1906.
H. DOWNS & W. C. WALLY.
DEVICE FOR COUPLING WIRE AND MANILA ROPE.
APPLICATION FILED JUNE 21, 1905.
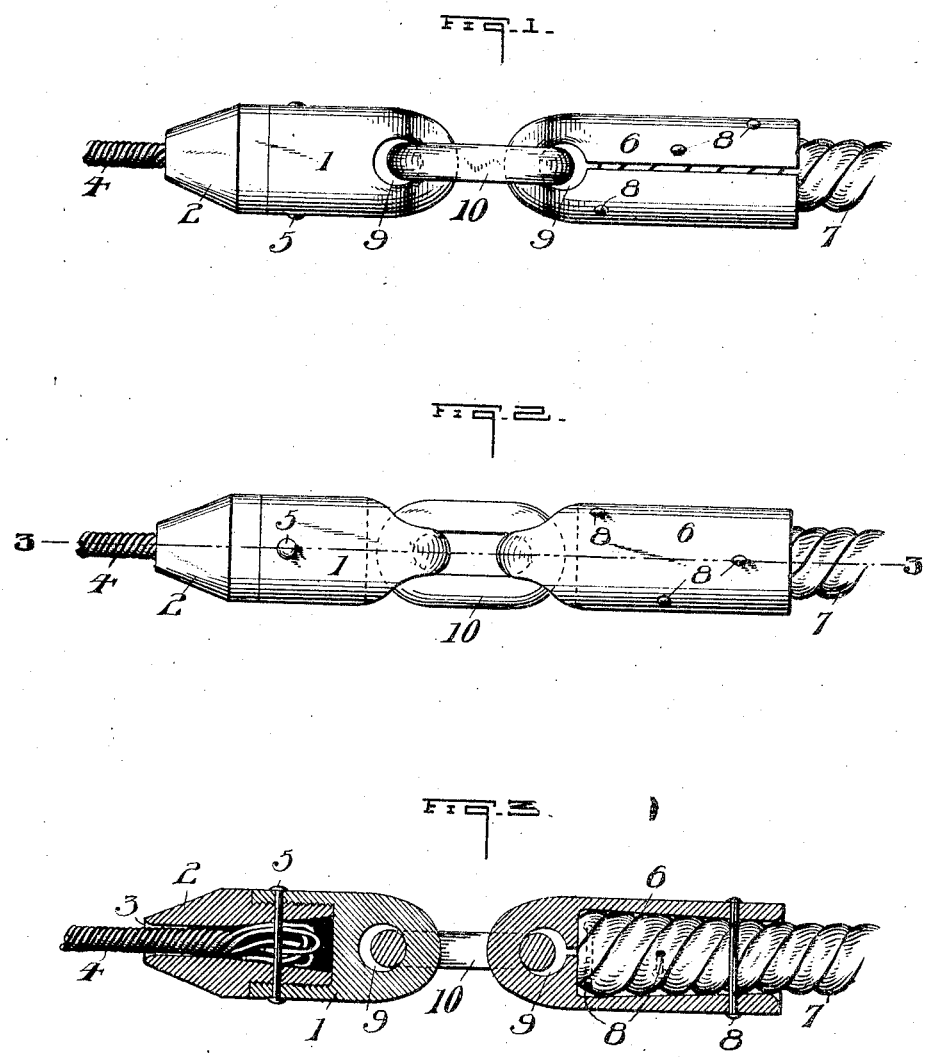
WITNESSES:
INVENTORS
Hugh Downs
William C. Wally
By H. W. Stimson
ATTORNEY

UNITED STATES PATENT OFFICE.

HUGH DOWNS, OF PITTSBURG, AND WILLIAM C. WALLY, OF ETNA, PENNSYLVANIA.

DEVICE FOR COUPLING WIRE AND MANILA ROPE.

No. 812,412.

Specification of Letters Patent.

Patented Feb. 13, 1906.

Application filed June 21, 1905. Serial No. 266,251.

*To all whom it may concern:*

Be it known that we, HUGH DOWNS, residing at Pittsburg, and WILLIAM C. WALLY, residing at Etna, in the county of Allegheny and State of Pennsylvania, citizens of the United States, have invented certain new and useful Improvements in Devices for Coupling Wire and Manila Rope; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to a new, novel, and useful improvement in a device for coupling the ends of a manila and wire rope, extensively used in oil and water well drilling.

Our device aims to overcome the difficulty of splicing the ends of a wire and manila rope and affords a means of securely uniting both ends thereof.

In the accompanying drawings, forming a part of this specification, we have illustrated our invention by several views, in which—

Figure 1 is a side view; Fig. 2, a top plan view; Fig. 3, a sectional view taken on line 3 3 of Fig. 2.

Numerals of reference designate like parts throughout the several views, the numeral 1 being an interiorly-threaded socket and 2 a securing member adapted to screw into the socket 1. Formed through the member 2 is an opening 3, the inner end tapering outward and forming a seat for the end of the wire rope 4.

5 is a securing-pin passing through the socket and securing member.

6 represents a tapered hollow split socket for securing the end of the manila rope 7, the latter being secured by means of pins 8 8.

Formed in the ends of the sockets 1 and 6 are eyes 9, through which is passed a link 10, thus uniting the two members.

The operation for securing the wire rope consists in first inserting the end thereof through the member 2, then loosening the strands of wire, and bunching the same so as to fill the tapered portion of the opening 3. This tapered opening is then babbitted, or filled with any other suitable packing, so as to securely lock the end of the wire rope in its seat. The cap-socket 1 is next screwed onto the securing member 2, and as an extra precaution against the rope pulling out of its seat the pin 5 is driven through the two members and incidentally through the strands of wire. The pin 5 holds the section or securing member 2 against displacement from the section or socket 1 and also holds the cable within the socket. The manila rope is then inserted in the split socket 6 and the ends thereof hammered together, thus securely clamping the rope, which will be prevented from pulling out of its seat by reason of the taper given to the opening and also by the pins 8 passing through the metal and rope. The two members 1 and 6 are next united by the link 10. Should the link 10 break during the process of drilling and let down the string of tools attached to the lower end of the manila rope, the cap-socket 6, being about nine inches in length, will fall against the side of the casing and can be readily caught by the fishing-tool. In case of breakage of the wire rope near the connection 3 this part of the coupling being also about nine inches in length will fall against the side of the casing and be readily caught by the ordinary fishing-tool. When drawing the tools out of the hole, the coupling device will readily pass over the crown-pulley on top of the derrick.

Having thus fully shown and described our invention, what we claim as new, and desire to secure by Letters Patent, is—

In a device of the character described, a socket formed in two sections, one threaded within the other, one of said sections being provided with an eye, said socket being adapted to receive the end of a cable, means passing through the contacting portions of the sections and the cable to hold the sections against displacement one from the other, and to hold the cable within the socket, a second socket adapted to receive the end of a cable and a link connection between the sockets.

In testimony whereof we affix our signatures in presence of two witnesses.

HUGH DOWNS.
WILLIAM C. WALLY.

Witnesses:
J. M. CORBOY,
C. E. CONLON.